(12) United States Patent
Shay

(10) Patent No.: US 11,889,783 B2
(45) Date of Patent: Feb. 6, 2024

(54) SEED PLANTING MACHINE

(71) Applicant: Farm Right, LLC, Shannon City, IA (US)

(72) Inventor: Cody Shay, Shannon City, IA (US)

(73) Assignee: FARM RIGHT, LLC, Shannon City, IA (US)

( * ) Notice: Subject to any disclaimer, the term of this patent is extended or adjusted under 35 U.S.C. 154(b) by 0 days.

(21) Appl. No.: 17/798,793

(22) PCT Filed: Feb. 26, 2021

(86) PCT No.: PCT/US2021/019786
§ 371 (c)(1),
(2) Date: Aug. 10, 2022

(87) PCT Pub. No.: WO2021/173908
PCT Pub. Date: Sep. 2, 2021

(65) Prior Publication Data
US 2023/0121517 A1      Apr. 20, 2023

Related U.S. Application Data

(60) Provisional application No. 62/982,530, filed on Feb. 27, 2020.

(51) Int. Cl.
*A01C 7/00* (2006.01)
*A01C 7/06* (2006.01)
(Continued)

(52) U.S. Cl.
CPC ............... *A01C 7/006* (2013.01); *A01C 1/06* (2013.01); *A01C 7/06* (2013.01); *A01C 21/007* (2013.01)

(58) Field of Classification Search
CPC ........... A01C 7/06; A01C 7/006; A01C 7/121; A01C 7/122; A01C 1/00; A01C 1/04;
(Continued)

(56) References Cited

U.S. PATENT DOCUMENTS 258,928 A  *  6/1882  Keith ...................... A01C 7/06
                                                     111/923
728,492 A  *  5/1903  Norris ..................... A01C 7/06
                                                     111/58
(Continued)

FOREIGN PATENT DOCUMENTS

CN      108738536 A  *  11/2018
CN      113366951 A  *  9/2021
(Continued)

OTHER PUBLICATIONS

International Search Report and Written Opinion, PCT/US21/19786, dated May 24, 2021, 7 Pages.

*Primary Examiner* — Alicia Torres
(74) *Attorney, Agent, or Firm* — Goodhue, Coleman & Owens, P.C.

(57) ABSTRACT

A seed planter for creating and planting together the combination of both seed and contents of a seed growing environment. The seed planter includes, for example, a wheeled frame configured with at least one soil opener and at least one soil closer for planting a field. A seed growing environment aggregator assembly has at least one input opening for receiving a plantable portion of a seed growth medium and seed from the seed hopper and at least one discharge opening for discharging an aggregation of the plantable portion of the seed growth medium and seed to the at least one soil opener for planting a desired growing environment in the field.

17 Claims, 13 Drawing Sheets

(51) Int. Cl.
*A01C 1/06* (2006.01)
*A01C 21/00* (2006.01)

(58) Field of Classification Search
CPC ........... A01C 1/042; A01C 1/044; A01C 1/06; A01C 21/007; A01C 11/02; A01C 11/025; A01C 2001/048
See application file for complete search history.

(56) References Cited

U.S. PATENT DOCUMENTS

| | | | |
|---|---|---|---|
| 3,848,772 A * | 11/1974 | Aanestad | A01C 1/06 |
| | | | 222/617 |
| 4,092,936 A | 6/1978 | Griffin | |
| 4,356,934 A * | 11/1982 | Knake | A01C 1/06 |
| | | | 47/DIG. 9 |
| 4,388,035 A | 6/1983 | Cayton | |
| 4,694,760 A | 9/1987 | Camp | |
| 5,165,351 A | 11/1992 | Billings | |
| 5,235,781 A | 8/1993 | Holley | |
| 5,573,558 A | 11/1996 | Huang | |
| 6,070,539 A * | 6/2000 | Flamme | A01M 7/0089 |
| | | | 701/50 |
| 6,748,885 B2 * | 6/2004 | Sauder | A01C 21/005 |
| | | | 111/180 |
| 7,174,671 B2 | 2/2007 | Moore | |
| 9,326,451 B1 | 5/2016 | Madsen | |
| 9,661,805 B1 | 5/2017 | Conrad | |
| 9,730,377 B2 * | 8/2017 | Kowalchuk | A01C 1/06 |
| 9,999,175 B2 | 6/2018 | Baurer | |
| 2011/0225884 A1 | 9/2011 | Johnson | |
| 2015/0223391 A1* | 8/2015 | Wendte | A01C 7/04 |
| | | | 111/177 |
| 2016/0135359 A1 | 5/2016 | Kowalchuk | |
| 2017/0049044 A1 | 2/2017 | Stoller | |
| 2017/0086352 A1 | 3/2017 | Frasier | |
| 2018/0192577 A1* | 7/2018 | Smith | A01C 7/20 |

FOREIGN PATENT DOCUMENTS

| | | | | |
|---|---|---|---|---|
| DE | 3314526 A * | 11/1983 | | A01C 1/08 |
| DE | 102009040514 A1 * | 3/2011 | | A01C 1/04 |

* cited by examiner

SEED PLANTING MACHINE

CROSS-REFERENCE TO RELATED APPLICATIONS

This application claims priority under 35 U.S.C. § 119 to provisional application Ser. No. 62/982,530 filed Feb. 27, 2020, which is incorporated by reference in its entirety.

FIELD OF THE INVENTION

The inventive concept relates generally to a seed planting machine.

BACKGROUND

There are a number of solutions for sowing seeds. Currently, seeds are planted in a furrow that is made into tilled soil to allow the seed to have a proper seedbed, but this solution fails because tillage is detrimental to the soil and the environment. Another solution attempts to plant seeds into untilled soils, but this solution fails because it does not put the seed into an environment conducive for proper germination. Still another solution attempts to coat the seed to make it impermeable to soil negativities, but this solution also fails to meet market demand because it does not address soil inequalities within the seed emergence zone. Therefore, there currently exists a need in the market for an apparatus, method and system that creates the desired growing environment, disposes seeds within the desired growing environment, and plants the combination of the seed and desired growing environment within a field to ensure health, viability, and improved yields.

SUMMARY OF THE INVENTION

It is therefore an object, feature, and advantage of the present disclosure to address the deficiencies and unsustainability of current farming practices.

It is a further object, feature, and advantage of the present disclosure to provide a sustainable seed planting apparatus, method, and system.

A still further object, feature, and advantage of the present disclosure is to provide a seed planting apparatus, method, and system that provides a sustainable solution for addressing the increasing number of rules and regulations governing farming and the management of land.

Yet another object, feature, and advantage of the present disclosure is to provide a seed planting apparatus, method, and system that changes how farmland is managed and the resources used, and carbons emitted in the process.

A further object, feature, and advantage of the present disclosure is to provide a seed planting apparatus, method, and system that manages and treats microscopic portions of farmland around each planted seed in lieu of managing and treating macroscopic portions of farmland.

A further object, feature, and advantage of the present disclosure to provide a seed planting apparatus, method, and system that creates and plants a combination of the ideal seed growing environment and seed during a planting operation.

A seed planter for creating and planting together the combination of both seed and contents of a seed growing environment is disclosed in accordance with at least one exemplary object, feature, and advantage of the present disclosure. The seed planter includes, for example, a wheeled frame driven by a motor. The wheeled frame may be configured with at least one soil opener and at least one soil closer for planting a field. A soil container assembly may be operably disposed on the wheeled frame. The soil container assembly may be configured for housing and metering soil. A seed hopper may also be disposed on the wheeled frame and configured for housing and metering seed. A seed growing environment aggregator assembly may also be operably disposed on the wheeled frame. The seed growing environment aggregator assembly may have at least one input opening for receiving a plantable portion of soil from the soil container and seed from the seed hopper and at least one discharge opening for discharging an aggregation of the plantable portion of soil and seed to the at least one soil opener for planting in the field.

A seed planting system for creating and planting together both seed and contents of a seed growing environment is disclosed in accordance with at least one other exemplary object, feature, and advantage of the present disclosure. The seed planting system includes, for example, a wheeled frame driven by a motor. The wheeled frame may be configured with at least one soil opener and at least one soil closer for planting a field. One or more agricultural content sources may also be disposed on the wheeled frame. The one or more agricultural content sources may house one or more types of agricultural seed growing content for preparing a seed growing environment, wherein at least one of the one or more types of agricultural seed growing content may include seed growth medium. A seed hopper may also be disposed on the wheeled frame and configured for housing and metering seed. A seed growing environment aggregator assembly may also be operably disposed on the wheeled frame. The seed growing environment aggregator assembly may have at least one input opening for receiving a plantable portion of the one or more types of agricultural seed growing content from one or more agricultural content sources and seed from the seed hopper and at least one discharge opening for discharging an aggregation of the plantable portion of the one or more types of agricultural seed growing content and seed to the at least one soil opener for planting in the field.

A method for planting seed by creating and planting together both seed and contents of a seed growing environment is disclosed in accordance with at least one exemplary object, feature, and advantage of the present disclosure. The method for planting seed includes steps and processes, in accordance with at least one exemplary aspect, such as, providing a wheeled frame driven by a motor. The wheeled frame may be configured with one or more soil openers, soil closers, types of agricultural seed growing content, seed, and seed growing environment aggregator assemblies operably disposed on the wheeled frame for planting seed together with contents of a seed growing environment within a field. The method may also include receiving a plantable portion of the one or more types of agricultural seed growing content and seed at the seed growing environment aggregator, preparing an aggregation of the plantable portion of the one or more types of agricultural seed growing content and seed, wherein at least one of the one or more types of agricultural seed growing content includes plant growth media for supporting plant growth, and discharging an aggregation of the plantable portion of the one or more types of agricultural seed growing content and seed to the one or more soil openers for planting in the field.

In at least one exemplary object, feature, and advantage of the present disclosure, the seed growing environment aggregator may be configured to include a seed casing assembly housing a plurality of seed casings for housing the aggregation of the plantable portion of soil and seed for planting in the field.

In at least one other exemplary object, feature, and advantage of the present disclosure, the seed growing environment aggregator may be configured to include a seed casing assembly housing one or more seed casing inputs for preparing a seed casing from the one or more seed casing inputs for housing the aggregation of the plantable portion of soil and seed for planting in the field.

In still another exemplary object, feature, and advantage of the present disclosure, a fertilizer container assembly may be operably disposed on the wheeled frame for housing and metering fertilizer.

In yet another exemplary object, feature, and advantage of the present disclosure, the seed growing environment aggregator assembly may be configured to includes the at least one input opening for receiving the plantable portion of soil from the soil container, fertilizer from the fertilizer container assembly, and seed from the seed hopper and the at least one discharge opening for discharging an aggregation of the plantable portion of soil, fertilizer, and seed to the at least one soil opener for planting in the field.

In a further exemplary object, feature, and advantage of the present disclosure, at least one controller may be configured for processing one or more field condition inputs for controlling the plantable portion of soil from the soil container assembly, seed from the seed hopper, and the aggregation from the seed growing environment aggregator assembly for preparing the aggregation of the plantable portion of soil and seed based on the one or more field condition inputs.

One of ordinary skill in the art would recognize that a quantity of seed, soil, or fertilizer is highly variable and would depend on such factors as the type of seed, the optimal soil and fertilizer for that type of seed, the optimal fertilizer and soil also depending on the conditions of the planted land, the general climate, the local climate, the immediate conditions of the field locally and generally, and other such factors that one of ordinary skill in the art would recognize for optimal agriculture yields. One of ordinary skill in the art would recognize that the soil or fertilizer may be measured using a metering arrangement or mechanism.

One of ordinary skill in the art would recognize that the inventive concept is a seed planting system and a seed planting row system that can work in unison with other like systems as a row planter.

The system may comprise a biodegradable canister, casing, or cartridge member made from such substances as paper or another fibrous material. In one exemplary aspect, the biodegradable canister, casing, or cartridge member is about one-half inches wide and three and one-quarter inches tall. One of ordinary skill in the art would recognize that the biodegradable canister, casing, or cartridge member may be constructed to be many different heights and widths. One of ordinary skill in the art would recognize the utility of a cylindrical canister, casing, or cartridge member and would also recognize the utility of a canister, casing, or cartridge member having polygonal sides. One of ordinary skill in the art would recognize that the thickness of the canister, casing, or cartridge member walls could vary widely.

It would be advantageous to have an apparatus that is mountable. Furthermore, it would also be advantageous to have an apparatus that is versatile. Still further, it would be advantageous to have an apparatus that is reusable. The inventive concept advantageously fills the aforementioned deficiencies by providing a seed planting machine, which provides a way for users to plant seeds efficiently and effectively. Among other things, it is an advantage of the inventive concept to provide a seed planting machine that does not suffer from problems or deficiencies associated with prior solutions.

A hopper is defined as a container for a bulk material such as seeds, soil, or fertilizer. A container for seed, soil, or fertilizer may be called a hopper. A casing can also mean a canister, cartridge, wrap, tube, straw, or other tube-type assembly that could contain a seed.

The inventive concept now will be described more fully hereinafter with reference to the accompanying drawings, which are intended to be read in conjunction with both this summary, the detailed description and any preferred and/or particular aspects specifically discussed or otherwise disclosed. This inventive concept may, however, be embodied in many different forms and should not be construed as limited to the aspects set forth herein; rather, these aspects are provided by way of illustration only and so that this disclosure will be thorough, complete, and will fully convey the full scope of the inventive concept to those skilled in the art.

BRIEF DESCRIPTION OF THE DRAWINGS

Illustrated embodiments of the disclosure are described in detail below with reference to the attached drawing figures, which are incorporated by reference herein, and where.

DETAILED DESCRIPTION OF THE INVENTION

Following are more detailed descriptions of various related concepts related to, and aspects of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The inventive concept is a seed planting apparatus, method, and system discussed herein and presented by pictorial representations providing illustrative aspects as shown, for example, in FIGS. 1-13.

Figure 1:
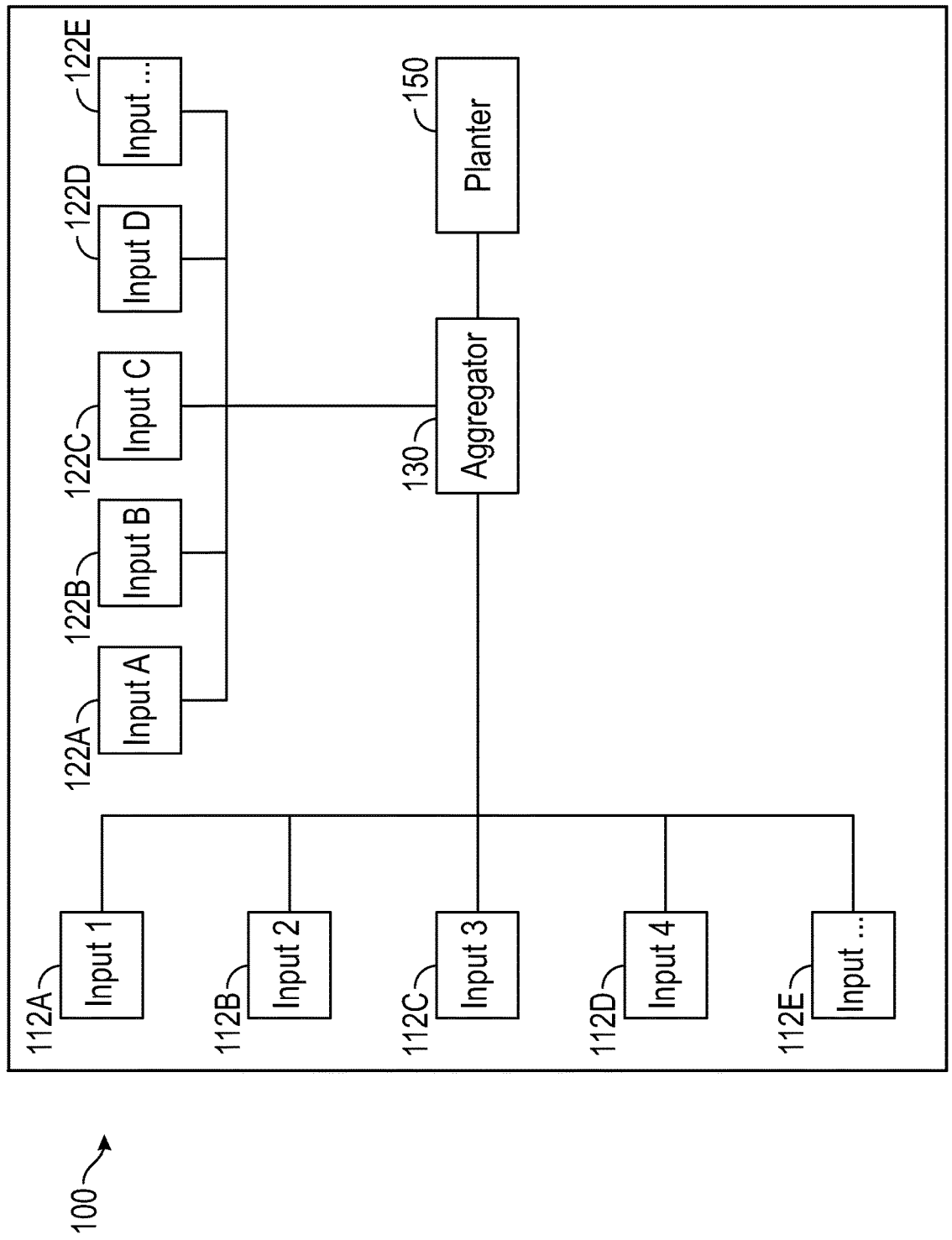
FIG. 1 is a pictorial representation of a diagram illustrating a seed planting system in accordance with an exemplary aspect of the present disclosure.

Referring to FIG. 1 a pictorial representation of a diagram illustrating a seed planting system 100 in accordance with an exemplary aspect of the present disclosure is shown. A primary object, feature, and advantage of the present disclosure is to provide a seed planting system 100 that creates an ideal or desired seed growing environment on a planter 150, combines a seed with the desired seed growing environment, and plants the combination of seed and the desired seed growing environment in a field. As used herein, the term "combination" includes a seed and one or more types and/or one or more amounts of content for creating a seed growing environment on a planter 150, where the combination is planted by the planter 150 within a field.

Figure 4:
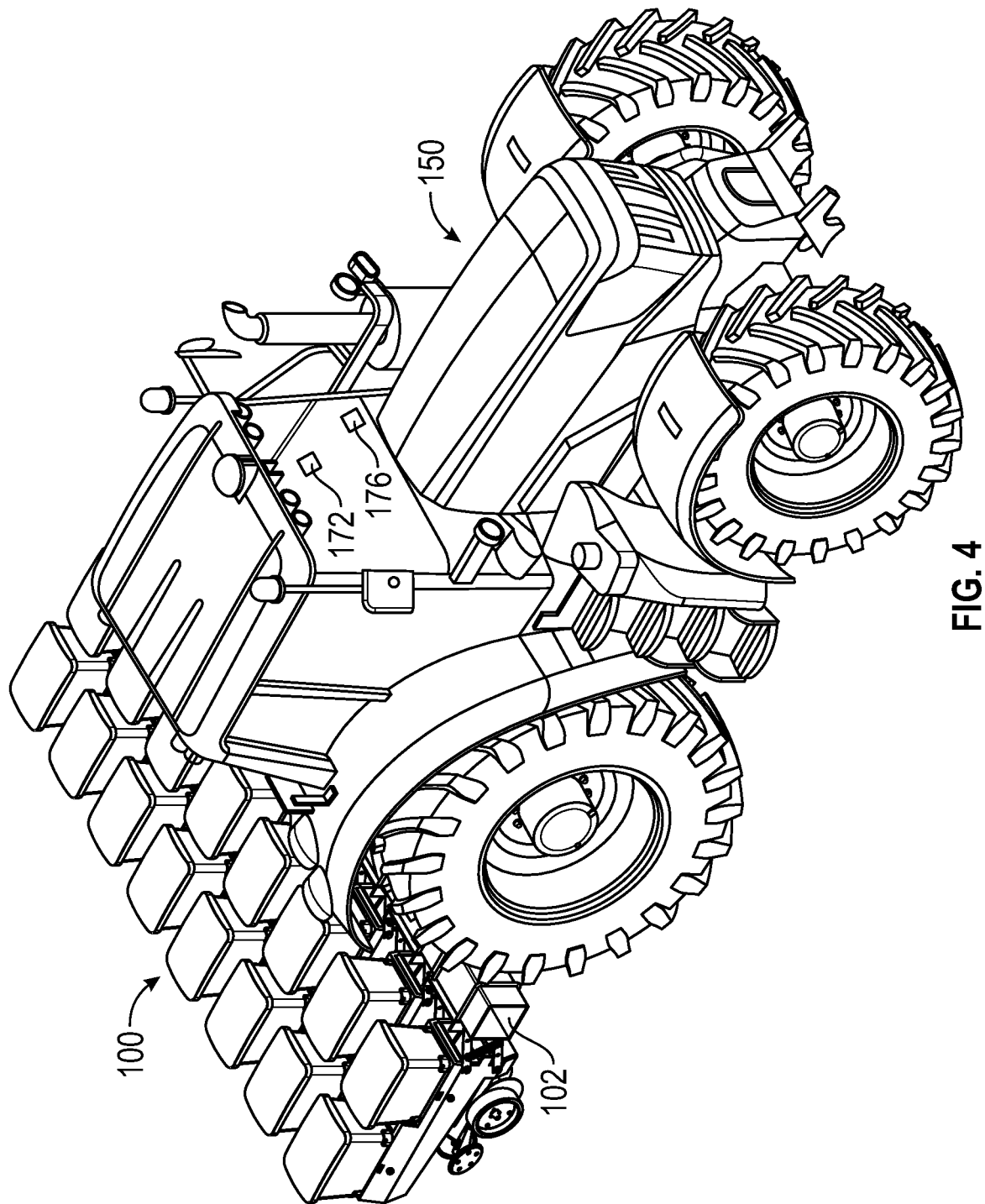
FIG. 4 is a pictorial representation of a towable seed planter in accordance with an illustrative aspect of the present disclosure.
Figure 5:
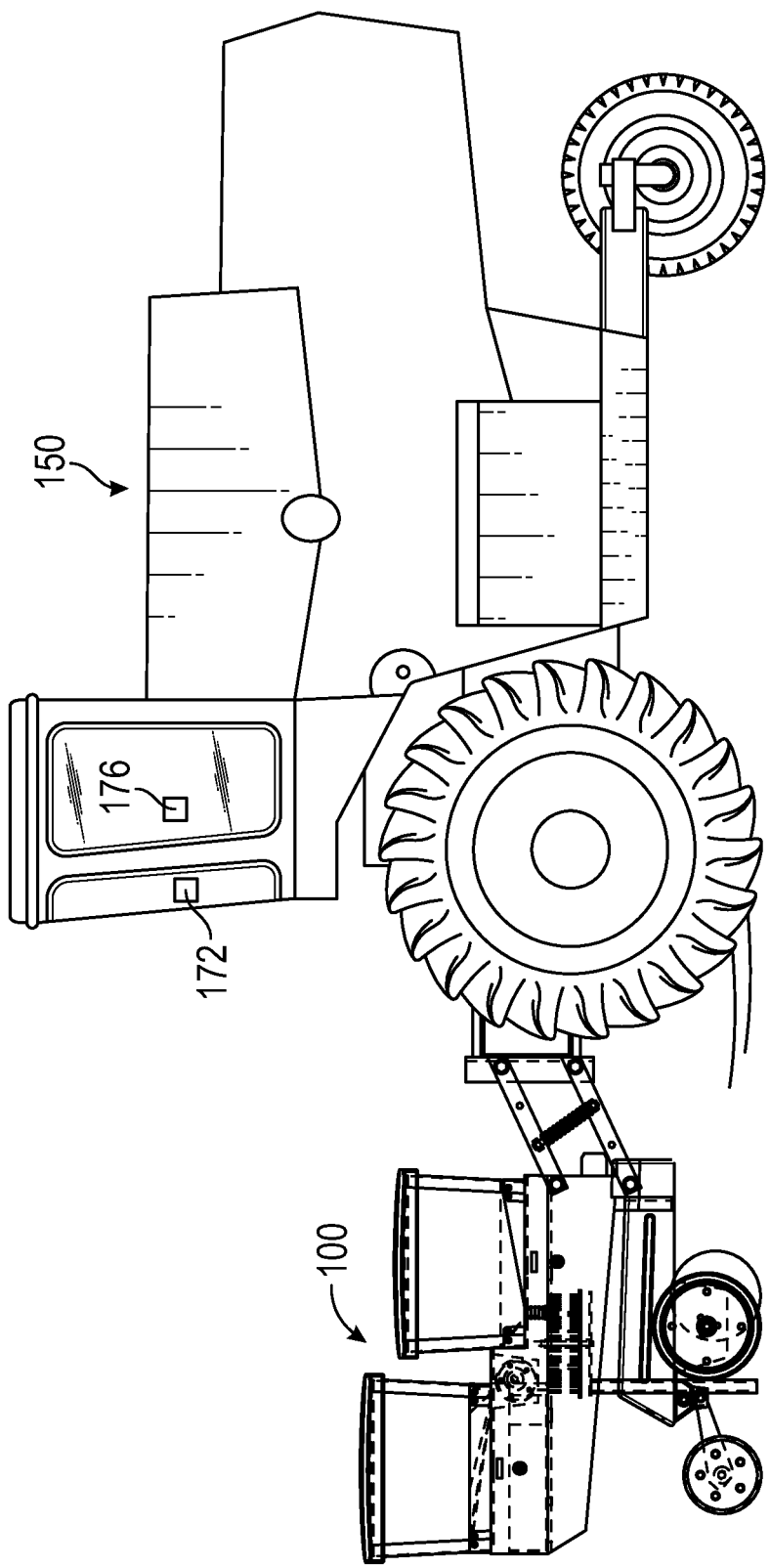
FIG. 5 is a pictorial representation of a seed planter in accordance with an illustrative aspect of the present disclosure.

The overall health, viability, and yield of the seed is generally based on the desired growing environment that was created on the planter 150 using the seed planting system 100 and planted with the seed and is not exclusively based on the soil conditions within any one field or controlling the soil conditions of an entire field. FIG. 1 provides a schematic for a seed planting system 100 that accomplishes all the objects, features, and advantages of the present disclosure. The seed planting system 100 can be operably configured as a towable implement as shown in FIG. 4 or a seed planter as shown in FIG. 5. As used herein, the term "planter" includes equipment, devices and other planter implement systems and/or technology used in planting operations. For example, the present disclosure contemplates that planters can include past planters, currently existing planters, future planters, and other current and future equipment used in the planting process, including tractors, cabins, nurse tanks and bulk input devices. The various features of the disclosure are useful in connection with any device used in planting one or more seeds (e.g., broadcast planters, drill planters, air planters, bulk planters, individual row unit planters, clamshell planters, cone planters, cyclone planters, pneumatic planters, finger planters, plate planters and the like), especially those devices that could be used to plant one or more combinations of seed and aggregated contents of a seed growing environment on a planter 150 for planting at one or more locations within a field.

The seed planting system 100 creates the desired seed planting environment by controlling several inputs into an aggregator 130. The contents of the aggregator 130 are planted within a field with the planter 150. The aggregator 130 can be a seed growing environment aggregator assembly. Inputs into the aggregator 130 are controlled to create a desired aggregation of the inputs for creating a desired seed planting environment within the aggregator 130. In one exemplary aspect, INPUT 1 (112A), INPUT 2 (112B), INPUT 3 (112C), INPUT 4 (112D), INPUT . . . (112E), include agricultural contents optimally suited for creating a desired seed planting environment. The INPUTS 112A-112E can include, but are not limited to, a type of seed (e.g., varieties, blends of varieties, hybrids, blends of hybrids and/or the like), in another example, a type of seed (e.g., distinct varieties, blends of hybrids, hybrid, hybrid blends, and/or the like), in another example, specialty crop seeds and commercial crop seeds. As used herein, the term "seed" includes seeds of any type of plants, including row crops, cereals, grains, oilseeds, fruits, vegetables, turf, forage, ornamental, nuts, tobacco, plantation crops and the like. The INPUTS 112A-112E can include, but are not limited to, content for creating soil growth mediums, such content as, sand, peat, silt, chalk, clay, and loam. The INPUTS 112A-112E can include, but are not limited to, one or more fertilizers, one or more insecticides, one or more herbicides, one or more fungicides, one or more biocides, one or more biologicals, one or more plant growth promotors, one or more inoculants, one or more nitrogen fixing bacteria, one or more nematicides, and including increasing/decreasing the rate and/or number of the same. The INPUTS 112A-112E can include, but are not limited to, one or more types of hydrogels.

The agricultural contents received into the aggregator 130 from INPUTS 112A-112 . . . can be, for example, encased, optimized, arranged, aggregated, and/or solidified using one or more content from INPUT A (122A), INPUT B (122B), INPUT C (122C), INPUT D (122D), INPUT . . . (122E). The agricultural contents received into the aggregator 130 from INPUTS 112A-112 . . . can be, for example, encased, optimized, arranged, aggregated, and/or solidified using one or more content from INPUT A (122A), INPUT B (122B), INPUT C (122C), INPUT D (122D), INPUT . . . (122E) in combination with any one or more or combination of INPUTS 112A-112E. The INPUTS 122A-122E can include, but are not limited to, any one of INPUTS 112A-112E or combination of INPUTS 112A-112E. The INPUTS 122A-122E can include, but are not limited to, one or more biodegradable binders, one or more biodegradable bonding agents, one or more biodegradable stabilization agents, one or more biodegradable adhesives, one or more biodegradable woven materials, one or more biodegradable nonwoven materials, one or more biodegradable non-synthetic fibers, one or more liquids (e.g., a liquid form or formulation of any one of the aforementioned materials and/or from any one of the INPUTS 112A-112E or combination of INPUTS 112A-112E), one or more biodegradable prefabricated materials (e.g., fabricated from any one of the aforementioned materials and/or from any one of the INPUTS 112A-112E or combination of INPUTS 112A-112E), such as, for encasing, optimizing, arranging, aggregating, and/or solidifying any one of INPUTS 112A-112E, INPUTS 122A-122E, or combination of INPUTS 112A-112E and INPUTS 122A-122E into a plantable aggregation of plant growing content.

The aggregation created in the aggregator 130 from the one or more, some, or all of the INPUTS 112A-112E and INPUTS 122A-122E is planted in a field by planter 150. A seed from one of INPUTS 112A-112E is combined with the aggregated seed growing environment contents created in the aggregator with one or more INPUTS 112A-112E and INPUTS 122A-122E to plant the combination of seed and desired seed growing environment within a field.

Figure 2:
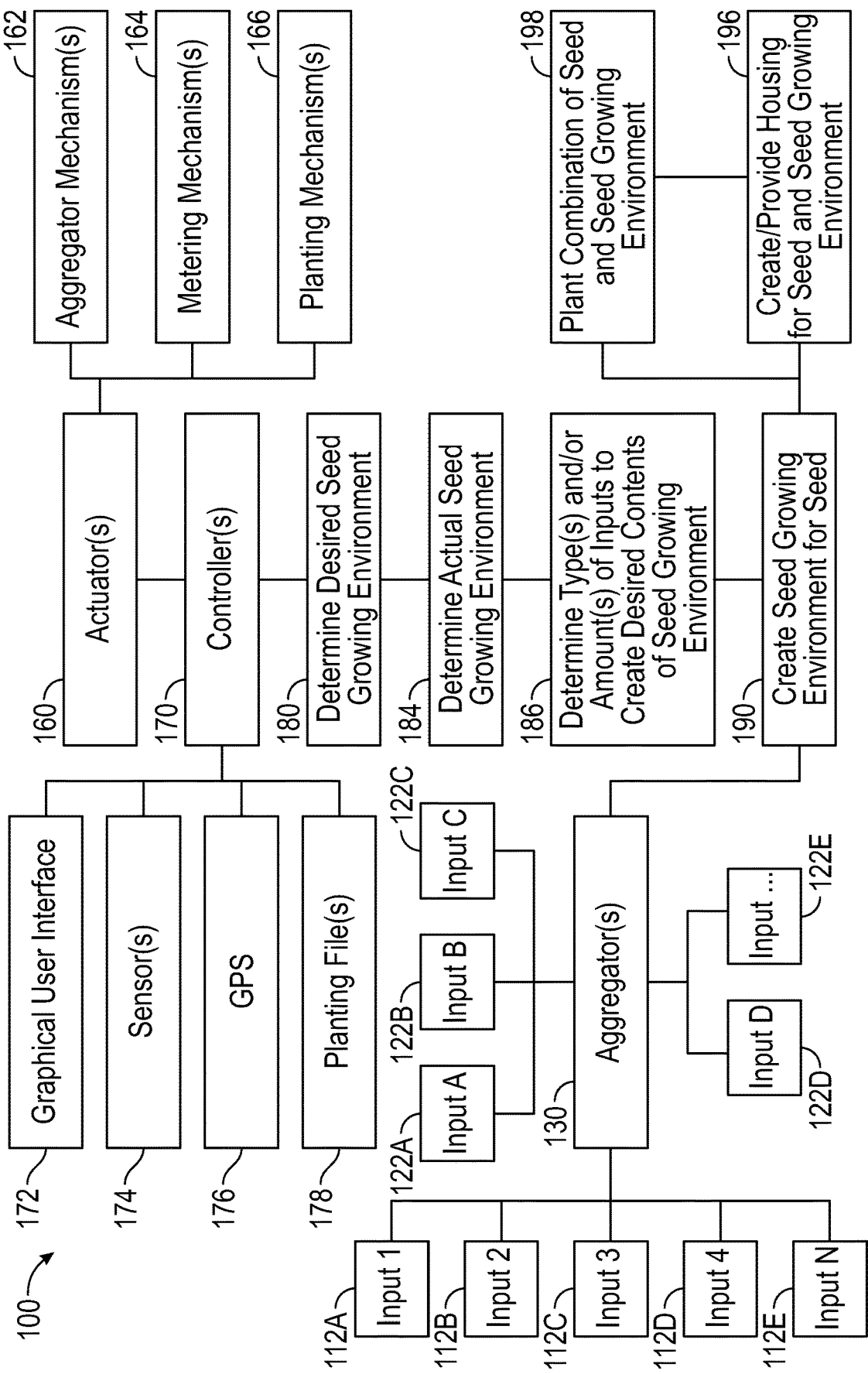
FIG. 2 is a pictorial representation of a diagram illustrating a seed planting system, method, and device for planting a seed and seed growing environment contents in accordance with an exemplary aspect of the present disclosure.

Referring to FIG. 2 a pictorial representation of a diagram illustrating a seed planting system, method, and device for planting a seed and seed growing environment contents in accordance with an exemplary aspect of the present disclosure is shown. A primary object, feature, and advantage of the seed planting system, method, and device 100 shown in FIG. 2 is to create an ideal or desired seed growing environment 180 on a planter 150, determine the actual seed growing environment in a field 184, determine the type(s) and/or amount(s) of INPUTS to create the desired contents of a seed growing environment 186, create the desired seed growing environment for a seed 190 on planter 150, combine a seed with the desired seed growing environment, optionally create or provide a housing for seed and seed growing environment contents 196, and plant the combination of seed and the desired seed growing environment in a field 198. The overall health, viability, and yield of the seed is generally based on determining the desired growing environment 180 that was created on the planter 150 using the seed planting system, method, and device 100 and planted with the seed as a combination. The overall health, viability, and yield of the seed in accordance with the objects, features, and advantages of the present disclosure is not exclusively based on the soil conditions within any one field or controlling the soil conditions of an entire field. FIG. 2 provides a schematic for a seed planting system, method, and device 100 that accomplishes all the objects, features, and advantages of the present disclosure. The seed planting system, method, and device 100 can be operably configured as a towable implement as shown in FIG. 4 or a seed planter as shown in FIG. 5. The seed planting system, method, and device 100 creates the desired seed planting environment by controlling INPUTS 112A-112E and INPUTS 122A-122E into an aggregator(s) 130 in combination with leveraging field and plant growing data providing one or more batches of actionable information, such as field and planting data (e.g., made operable via planting file(s) 178, GPS 176, sensors 174, controller(s) 170, and/or actuator(s) 160), presented to an operator via a graphical user interface 172 for determining the type(s) and/or amount(s) of INPUTS 112A-112E and INPUTS 122A-122E 186 for preparing a plantable seed growing environment 190 on planter 150. The seed and seed growing contents of the aggregator 130 are planted within a field with the planter 150 using one or more actuator(s) 160 (e.g., planting mechanism(s) 166) based on one or more batches of actionable information, such as field and planting data (e.g., made operable via planting file(s) 178, GPS 176, sensors 174, controller(s) 170, and/or actuator(s) 160). The aggregator(s) 130 can be a seed growing environment aggregator assembly. Inputs into the aggregator 130 are controlled with one or more controller(s) 170 operating one or more actuators 160 (e.g., aggregator mechanism(s) 162 and/or metering mechanism(s) 164) based on one or more batches of actionable information, such as field and planting data (e.g., made operable via planting file(s) 178, GPS 176, sensors 174, controller(s) 170, and/or actuator(s) 160), to create a desired aggregation of the INPUTS for creating a desired seed planting environment 190 from contents of INPUTS aggregated within the aggregator(s) 130. In one exemplary aspect, INPUT 1 (112A), INPUT 2 (112B), INPUT 3 (112C), INPUT 4 (112D), INPUT . . . (112E), include agricultural contents optimally suited for creating a desired seed planting environment 190 based on the determined seed growing environment 180 and the actual seed growing environment 184 (e.g., conditions in the field). Condition(s) can include, but are not limited to, any circumstance that can impact what seed to be planted at a particular location and/or the type(s) and/or amount(s) 186 of contents of the seed growing environment created 190 on planter 150. In some embodiments, these conditions can include historical conditions, current conditions, future and/or predictive conditions and the like. By way of example, historical conditions can include past pests and/or diseases (e.g., corn rootworms, cutworms, aphids, nematodes, white mold, fungus), pest pressures, soil types, weather conditions, water levels, soil conditions (e.g., last-known nutrient, fertility, temperature and/or moisture levels of the soil), weeds, weed pressures, knowledge of the terrain of the field, and/or planting practices and/or associated yields. By way of further example, current conditions can include current pest type and/or levels, pest pressure, soil type, weather conditions, planting date, water levels, soil conditions, weed levels, weed type, weed pressure, field terrain of the field, global positioning system (GPS) coordinates 176, geographical location of the system 100, geographical location, other location-based conditions, seed availability, nearby pest pressures and/or trends, commodity pricing and/or other market conditions, planter gas level, planter engine and/or ground speed and/or other planting operational monitoring information (e.g. via planting file(s) 178, GPS 176, sensors 174, controller(s) 170, and/or actuator(s) 160). By way of still further example, future conditions can include weather forecasts and/or predictions, projected planting date, projected yield of seeds, and/or predicted commodity pricing and/or other market conditions. Additionally, the conditions can be based, at least in part, on historical measurements, real-time measurements, predicative measurements, analytics and/or the like. The INPUTS 112A-112E can include, but are not limited to, a type of seed (e.g., varieties, blends of varieties, hybrids, blends of hybrids and/or the like), in another example, a type of seed (e.g., distinct varieties, blends of hybrids, hybrid, hybrid blends, and/or the like), in another example, specialty crop seeds and commercial crop seeds. The INPUTS 112A-112E can include, but are not limited to, content for creating soil growth mediums, such content as, sand, peat, silt, chalk, clay, and loam. The INPUTS 112A-112E can include, but are not limited to, one or more fertilizers, one or more insecticides, one or more herbicides, one or more fungicides, one or more biocides, one or more biologicals, one or more plant growth promotors, one or more inoculants, one or more nitrogen fixing bacteria, one or more nematicides, and including increasing/decreasing the rate and/or number of the same. The INPUTS 112A-112E can include, but are not limited to, one or more types of hydrogels. One or more content from INPUTS 112A-112E can be metered into aggregator(s) 130 using one or more actuator(s) 160 (e.g., metering mechanism(s) 164) based on one or more batches of actionable information, such as field and planting data and desired seed growing environment 180 (e.g., made operable via planting file(s) 178, GPS 176, sensors 174, controller(s) 170, and/or actuator(s) 160).

The agricultural contents received into the aggregator(s) 130 from INPUTS 112A-112 . . . can be, for example, encased, optimized, arranged, aggregated, and/or solidified 196 using one or more content from INPUT A (122A), INPUT B (122B), INPUT C (122C), INPUT D (122D), INPUT . . . (122E) using one or more actuator(s) 160 (e.g., aggregator mechanism(s) 164) based on one or more batches of actionable information, such as field and planting data and desired seed growing environment 180 (e.g., made operable via planting file(s) 178, GPS 176, sensors 174, controller(s) 170, and/or actuator(s) 160). The agricultural contents received into the aggregator(s) 130 from INPUTS 112A-112E can be, for example, encased, optimized, arranged, aggregated, and/or solidified 190, 196 using one or more content from INPUT A (122A), INPUT B (122B), INPUT C (122C), INPUT D (122D), INPUT . . . (122E) in combination with any one or more or combination of INPUTS 112A-112E using one or more actuator(s) 160 (e.g., aggregator mechanism(s) 164) based on one or more batches of actionable information, such as field and planting data and desired seed growing environment 180 (e.g., made operable via planting file(s) 178, GPS 176, sensors 174, controller(s) 170, and/or actuator(s) 160). The controller(s) 170 can select from the INPUTS 122A-122E, which may include, but are not limited to, any one of INPUTS 112A-112E or combination of INPUTS 112A-112E. The selection and aggregation of INPUTS 112A-112E and 122A-122E may be achieved using one or more actuator(s) 160 (e.g., metering mechanism(s) 164 & aggregator mechanism(s) 164) operating based on one or more batches of actionable information, such as field and planting data and desired seed growing environment 180 (e.g., made operable via planting file(s) 178, GPS 176, sensors 174, controller(s) 170, and/or actuator(s) 160). The INPUTS 122A-122E can include, but are not limited to, one or more biodegradable binders, one or more biodegradable bonding agents, one or more biodegradable stabilization agents, one or more biodegradable adhesives, one or more biodegradable woven materials, one or more biodegradable non-woven materials, one or more biodegradable non-synthetic fibers, one or more liquids (e.g., a liquid form or formulation of any one of the aforementioned materials and/or from any one of the INPUTS 112A-112E or combination of INPUTS 112A-112E), one or more biodegradable prefabricated materials (e.g., fabricated from any one of the aforementioned materials and/or from any one of the INPUTS 112A-112E or combination of INPUTS 112A-112E), such as, for encasing, optimizing, arranging, aggregating, and/or solidifying 190, 196 any one of INPUTS 112A-112E, INPUTS 122A-122E, or combination of INPUTS 112A-112E and INPUTS 122A-122E into a plantable aggregation of plant growing content, which combination of seed and created seed growing environment is planted within a field 198.

The aggregation created in the aggregator(s) 130 from the one or more, some, or all of the INPUTS 112A-112E and INPUTS 122A-122E is planted 198 in a field by planter 150. A seed from one of INPUTS 112A-112E is combined in the aggregator(s) 130 with the aggregated seed growing environment contents created 190 in the aggregator(s) 130 with one or more INPUTS 112A-112E and INPUTS 122A-122E 186 to plant the combination of seed and desired seed growing environment within a field 198. In at least one aspect, a housing is created/provided for housing the seed growing environment 196 using one or more, some, or all of the INPUTS 112A-112E and/or INPUTS 122A-122E. A seed from one of INPUTS 112A-112E is combined in the aggregator(s) 130 with the aggregated seed growing environment contents created 190 in the aggregator(s) 130 with one or more INPUTS 112A-112E and INPUTS 122A-122E 186, and the aggregation of seed growing content and seed is housed in a housing/casing that is created/provide from one or more, some, or all of the INPUTS 112A-112E and/or 122A-122E 196 to plant the combination of seed, contents of seed growing environment, and housing for the seed and contents of seed growing environment within a field 198.

Figure 3:
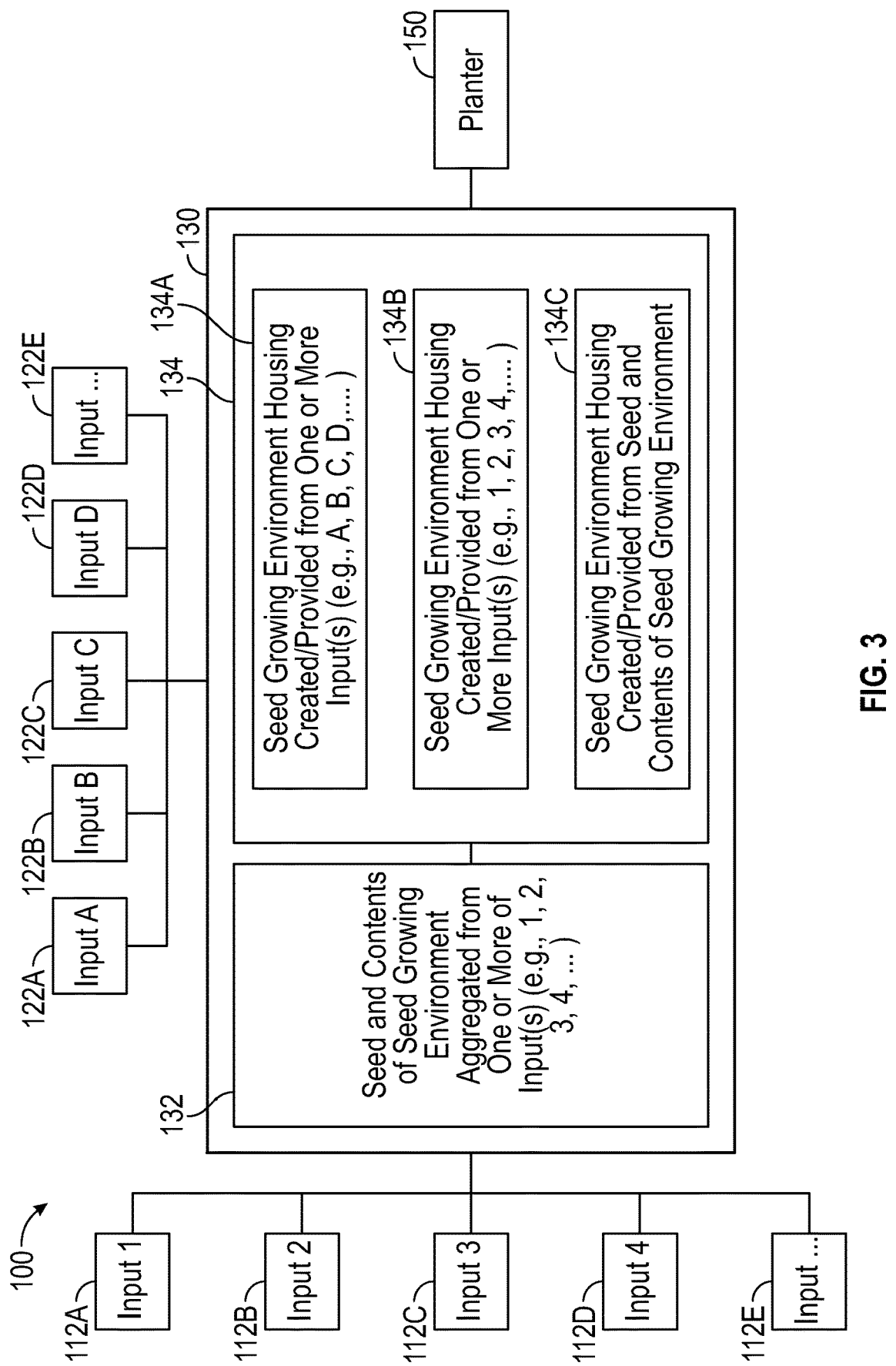
FIG. 3 is a pictorial representation of a diagram illustrating seed planting by creating a seed planting environment for the seed planting contents in accordance with an exemplary aspect of the present disclosure.

Referring to FIG. 3 a pictorial representation of a diagram illustrating seed planting by creating a seed growing environment for the seed growing contents in accordance with an exemplary aspect of the present disclosure is shown. Referring to FIG. 3 a pictorial representation of a diagram illustrating a seed planting system, method, and device 100 for planting a combination of seed and seed growing environment contents from an aggregator 130 in accordance with an exemplary aspect of the present disclosure is shown. A primary object, feature, and advantage of the seed planting system, method, and device 100 shown in FIG. 3 is to create an ideal or desired seed growing environment 134 on a planter 150, by aggregating seed and seed growing content for a seed growing environment 132 from the various type(s) and/or amount(s) of INPUTS, providing/creating a seed growing environment 134 for housing the aggregation 132 of seed and seed growing content, and planting a combination of seed and seed growing content in a field with a planter 150. The overall health, viability, and yield of the seed is generally based on determining the desired growing environment 180 that was created on the planter 150 using the seed planting system, method, and device 100 and planted with the seed and is not exclusively based on the soil conditions within any one field or controlling the soil conditions of an entire field. FIG. 3 provides a schematic for a seed planting system, method, and device 100 that accomplishes all the objects, features, and advantages of the present disclosure. The seed planting system, method, and device 100 can be operably configured as a towable implement as shown in FIG. 4 or a seed planter as shown in FIG. 5. The seed planting system, method, and device 100 creates the desired seed growing environment 132 by controlling INPUTS 112A-112E, INPUTS 122A-122E, and field and growing data providing one or more batches of actionable information, such as field and planting data (e.g., made operable via planting file(s) 178, GPS 176, sensors 174, controller(s) 170, and/or actuator(s) 160 shown in FIG. 2), presented to an operator via a graphical user interface 172 shown in FIG. 2. The seed planting system, method, and device 100 may also be configured to create the desired seed growing environment housing 134 by controlling INPUTS 112A-112E and/or INPUTS 122A-122E, and any field and/or growing data providing one or more batches of actionable information, such as field and planting data (e.g., made operable via planting file(s) 178, GPS 176, sensors 174, controller(s) 170, and/or actuator(s) 160 shown in FIG. 2), presented to an operator via a graphical user interface 172 shown in FIG. 2 for determining the type(s) and/or amount(s) of INPUTS 112A-112E and/or INPUTS 122A-122E 186 for preparing a plantable seed growing environment housing 134 on planter 150. The seed and seed growing contents of the aggregator 130 are planted within a field with the planter 150 using one or more actuator(s) 160 (e.g., planting mechanism(s) 166), shown in FIG. 2, based on one or more batches of actionable information, such as field and/or planting data (e.g., made operable via planting file(s) 178, GPS 176, sensors 174, controller(s) 170, and/or actuator(s) 160 shown in FIG. 2). In another aspect, the seed, seed growing contents 132, and seed growing environment 134 are aggregated and formed using aggregator 130, and the combination of these are planted within a field with the planter 150 using one or more actuator(s) 160 (e.g., planting mechanism(s) 166), shown in FIG. 2, based on one or more batches of actionable information, such as field and/or planting data (e.g., made operable via planting file(s) 178, GPS 176, sensors 174, controller(s) 170, and/or actuator(s) 160 shown in FIG. 2). The aggregator(s) 130 can be a seed growing environment housing aggregator assembly 134. Inputs into the seed growing environment housing aggregator assembly 134 may be controlled with one or more controller(s) 170 operating one or more actuators 160 (e.g., aggregator mechanism(s) 162 and/or metering mechanism(s) 164) based on one or more batches of actionable information, such as field and/or planting data (e.g., via planting file(s) 178, GPS 176, sensors 174, controller(s) 170, and/or actuator(s) 160) shown in FIG. 2, to create a desired aggregation of the inputs for creating a desired seed planting environment housing 134A, 134B, 134C created/provided within seed growing environment housing aggregator assembly 134. In one exemplary aspect, INPUT 1 (112A), INPUT 2 (112B), INPUT 3 (112C), INPUT 4 (112D), INPUT . . . (112E), include agricultural contents optimally suited for creating seed growing environment housing(s)

within seed growing environment housing aggregator assembly 134 based on the determined seed growing environment housing and the actual seed growing environment 184 (e.g., conditions in the field) shown in FIG. 2. In another exemplary aspect, INPUT A (122A), INPUT B (122B), INPUT C (122C), INPUT D (122D), INPUT . . . (122E), include agricultural contents optimally suited for creating seed growing environment housing(s) within seed growing environment housing aggregator assembly 134 based on the determined seed growing environment housing and the actual seed growing environment 184 (e.g., conditions in the field) shown in FIG. 2. In still another exemplary aspect, INPUT 1 (112A), INPUT 2 (112B), INPUT 3 (112C), INPUT 4 (112D), INPUT . . . (112E) and/or INPUT A (122A), INPUT B (122B), INPUT C (122C), INPUT D (122D), INPUT . . . (122E), include agricultural contents optimally suited for creating seed growing environment housing(s) within seed growing environment housing aggregator assembly 134 based on the determined seed growing environment housing and the actual seed growing environment 184 (e.g., conditions in the field) shown in FIG. 2. Condition(s) can include, but are not limited to, any circumstance that can impact what seed to be planted at a particular location and/or the type(s) and/or amount(s) of contents of the seed growing environment housing 134A, 134B, 134C created/provided within seed growing environment housing aggregator assembly 134 on planter 150. In some embodiments, these conditions can include historical conditions, current conditions, future and/or predictive conditions and the like. By way of example, historical conditions can include past pests and/or diseases (e.g., corn rootworms, cutworms, aphids, nematodes, white mold, fungus), pest pressures, soil types, weather conditions, water levels, soil conditions (e.g., last-known nutrient, fertility, temperature and/or moisture levels of the soil), weeds, weed pressures, knowledge of the terrain of the field, and/or planting practices and/or associated yields. By way of further example, current conditions can include current pest type and/or levels, pest pressure, soil type, weather conditions, planting date, water levels, soil conditions, weed levels, weed type, weed pressure, field terrain of the field, global positioning system (GPS) coordinates 176 (FIG. 2), geographical location of the system 100, geographical location, other location-based conditions, seed availability, nearby pest pressures and/or trends, commodity pricing and/or other market conditions, planter gas level, planter engine and/or ground speed and/or other planting operational monitoring information (e.g. made operable via planting file(s) 178, GPS 176, sensors 174, controller(s) 170, and/or actuator(s) 160 shown in FIG. 2). By way of still further example, future conditions can include weather forecasts and/or predictions, projected planting date, projected yield of seeds, and/or predicted commodity pricing and/or other market conditions. Additionally, the conditions can be based, at least in part, on historical measurements, real-time measurements, predicative measurements, analytics and/or the like. The INPUTS 112A-112E can include, but are not limited to, a type of seed (e.g., varieties, blends of varieties, hybrids, blends of hybrids and/or the like), in another example, a type of seed (e.g., distinct varieties, blends of hybrids, hybrid, hybrid blends, and/or the like), in another example, specialty crop seeds, cover crops, and commercial crop seeds. The INPUTS 112A-112E can include, but are not limited to, content for creating soil growth mediums, such content as, sand, peat, silt, chalk, clay, and loam. The INPUTS 112A-112E can include, but are not limited to, one or more fertilizers, one or more insecticides, one or more herbicides, one or more fungicides, one or more biocides, one or more biologicals, one or more plant growth promotors, one or more inoculants, one or more nitrogen fixing bacteria, one or more nematicides, and including increasing/decreasing the rate and/or number of the same. The INPUTS 112A-112E can include, but are not limited to, one or more types of hydrogels. Similarly, the INPUTS 122A-122E can include, but are not limited to, a type of seed (e.g., varieties, blends of varieties, hybrids, blends of hybrids and/or the like), in another example, a type of seed (e.g., distinct varieties, blends of hybrids, hybrid, hybrid blends, and/or the like), in another example, specialty crop seeds, cover crops, and commercial crop seeds. The INPUTS 122A-122E can include, but are not limited to, content for creating soil growth mediums, such content as, sand, peat, silt, chalk, clay, and loam. The INPUTS 122A-122E can include, but are not limited to, one or more fertilizers, one or more insecticides, one or more herbicides, one or more fungicides, one or more biocides, one or more biologicals, one or more plant growth promotors, one or more inoculants, one or more nitrogen fixing bacteria, one or more nematicides, and including increasing/decreasing the rate and/or number of the same. The INPUTS 122A-122E can include, but are not limited to, one or more types of hydrogels. One or more content from INPUTS 112A-112E can be metered into seed growing environment housing aggregator assembly 134 using one or more actuator(s) 160 (e.g., metering mechanism(s) 164) based on one or more batches of actionable information, such as field and/or planting data and desired seed growing environment housing 134A, 134B, 134C (e.g., made operable via planting file(s) 178, GPS 176, sensors 174, controller(s) 170, and/or actuator(s) 160 shown in FIG. 2).

The agricultural contents received into the seed growing environment housing aggregator assembly 134 from INPUTS 112A-112 . . . can be, for example, encased, optimized, arranged, aggregated, and/or solidified using one or more content from INPUT A (122A), INPUT B (122B), INPUT C (122C), INPUT D (122D), INPUT . . . (122E) using one or more actuator(s) 160 (e.g., aggregator mechanism(s) 164) based on one or more batches of actionable information, such as field and/or planting data and desired seed growing environment housing information (e.g., made operable via planting file(s) 178, GPS 176, sensors 174, controller(s) 170, and/or actuator(s) 160 shown in FIG. 2). The agricultural contents received into the seed growing environment housing aggregator assembly 134 from INPUTS 112A-112 . . . can be, for example, encased, optimized, arranged, aggregated, and/or solidified using one or more content from INPUT A (122A), INPUT B (122B), INPUT C (122C), INPUT D (122D), INPUT . . . (122E) in combination with any one or more or combination of INPUTS 112A-112E using one or more actuator(s) 160 (e.g., aggregator mechanism(s) 164) based on one or more batches of actionable information, such as field and/or planting data and desired seed growing environment housing information (e.g., made operable via planting file(s) 178, GPS 176, sensors 174, controller(s) 170, and/or actuator(s) 160 shown in FIG. 2). The controller(s) 170 can select from the INPUTS 122A-122E, which may include, but are not limited to, any one of INPUTS 112A-112E or combination of INPUTS 112A-112E. The selection and aggregation of INPUTS 112A-112E and 122A-122E may be achieved using one or more actuator(s) 160 (e.g., metering mechanism(s) 164 & aggregator mechanism(s) 164) operating based on one or more batches of actionable information, such as field and/or planting data and desired seed growing environment housing information (e.g., made operable via planting file(s) 178, GPS 176, sensors 174, controller(s) 170, and/or actuator(s) 160 shown in FIG. 2). The INPUTS 122A-122E can include, but are not limited to, one or more biodegradable binders, one or more biodegradable bonding agents, one or more biodegradable stabilization agents, one or more biodegradable adhesives, one or more biodegradable woven materials, one or more biodegradable non-woven materials, one or more biodegradable non-synthetic fibers, one or more liquids (e.g., a liquid form or formulation of any one of the aforementioned materials and/or from any one of the INPUTS 112A-112E or combination of INPUTS 112A-112E), one or more biodegradable prefabricated materials (e.g., fabricated from any one of the aforementioned materials and/or from any one of the INPUTS 112A-112E or combination of INPUTS 112A-112E), such as, for encasing, optimizing, arranging, aggregating, and/or solidifying any one of INPUTS 112A-112E, INPUTS 122A-122E, or combination of INPUTS 112A-112E and INPUTS 122A-122E into a plantable aggregation of plant growing content, which combination of seed and created seed growing environment housing 134A, 134B, or 134C is planted within a field 198. According to the aforementioned aspects of the present disclosure, the seed growing environment housing aggregator assembly 134 can create/provide a seed growing environment housing from INPUTS 122A-122E 134A, can create/provide a seed growing environment housing from INPUTS 112A-112E 134B, and/or can create/provide a seed growing environment housing from seed and contents of seed growing environment 134C.

Referring to FIG. 4 a pictorial representation of a towable seed planter in accordance with an illustrative aspect of the present disclosure is shown. The planter 150 can be configured with a graphical user interface 172 and GPS shown here and in FIG. 2 for providing the functionalities discussed herein to an operator of the planter 150. The seed planting system 100 is operably connected to the planter via toolbar 102 as a towable implement. The seed planting system 100 may be configured to be driven hydraulically, pneumatically, electrically, and/or mechanically (e.g., driven by rotation of one or more ground driven wheels, such as wheels 900).

Referring to FIG. 5 a pictorial representation of a seed planter in accordance with an illustrative aspect of the present disclosure is shown. The seed planter 150 can be configured with a graphical user interface 172 and GPS shown here and in FIG. 2 for providing the functionalities discussed herein to an operator of the see planter 150. The seed planter 150 includes a seed planting system 100 as shown in FIG. 5. The seed planting system 100 may be configured to be driven hydraulically, pneumatically, electrically, and/or mechanically (e.g., driven by rotation of one or more ground driven wheels, such as wheels 900).

Referring to FIGS. 6-11 various views of a seed planter are illustrated in accordance with an exemplary aspect of the present disclosure. In accordance with providing the objects, features, and advantages of the present disclosure, FIGS. 6-11 illustrate a seed planting system 100 having a frame 104 supported by a toolbar 102. The seed planting system 100 may be configured with one or more hopper assemblies 200. For example, the hopper assemblies 200 can include having at least one hopper assembly 210 for housing one or more of INPUTS 112A-112E and at least one hopper assembly 220 for housing one or more INPUTS 122A-122E. The hopper assemblies 210, 220 can be configured to have at least one depositing (hinged, sliding, rotating, or barrier) configuration 300 designed for controlling the passage of one or more of INPUTS 112A-112E and/or one or more INPUTS 122A-122E through one or more channel assemblies 400. One or more actuators 160 (see FIG. 2) can include one or more metering mechanisms 164. In one such arrangement, a metering mechanism 410 is operably coupled to an output 450 of the hopper 210 and an output of the hopper assembly 220. Hopper 210 is operably configured for metering at least one or more of INPUTS 112A-122E, such as seed, into an individual canister, casing or cartridge member 500 of aggregator 130. The aggregator 130 housing a metering arrangement or mechanism 410 using aggregator mechanism 162 (see FIG. 2) includes a rotary member 600 with a plurality of canister, casing or cartridge members 500 disposed radially about the rotary member 600 in an upright position, the metering arrangement or mechanism 410 being designed to aggregate in at least one canister, casing or cartridge member 500 within a seed canister, casing or cartridge assembly 650. The canister, casing, or cartridge member 500 is configured to contain at least one quantity of one or more seed elements along with INPUTS 112A-112E and/or 122A-122E. At least one concave housing 700 of aggregator 1230 may be configured for holding or providing one or more of the INPUTS 112A-112E and/or 122A-122E, such as a supply of a plurality of housings, canisters, casings, or cartridge members 500. In at least one aspect, one or more INPUTS 112A-112E from hopper assemblies 200 are selected for aggregating within aggregator 130. For example, a seed may be selected from one of the one or more inputs for aggregating with one or more other INPUTS 112A-112E within aggregator 130. Additionally, one or more INPUTS 122A-122E may be aggregated with the seed and any one or more of the other selected INPUTS 112A-112E within aggregator 130 for aggregating contents of a seed growing environment as discussed herein. The housing for the seed growing environment may be aggregated from one or more of the INPUTS 112A-112E and/or 122A-122E. The combination of seed and contents of the seed growing environment may be planted or the combination of seed, contents of the seed growing environment, and housing for the seed growing environment may be planted. A planting system can be configured with at least one seed tube or chute 800 is coupled to an outlet 850 of the rotary member 600 and designed to convey at least one seed canister, casing, or cartridge assembly 650 from the rotary member 600 to the ground. The at least one seed canister, casing, or cartridge assembly 650 can be made from any one or more of INPUTS 112A-112E and INPUTS 122A-122E. For example, the at least one seed canister, casing, or cartridge assembly 650 can be made from a fertilizer. The planting system can also be configured with at least one or more adjustable wheels 900 or blades 910 are disposed in front of the at least one seed chute 800 designed to be adjustable to a selected soil depth. At least one trench closing assembly 950 includes a set of wheels or blades 960 behind the at least one seed chute 800, wherein the at least one wheels or blades 960 of trench closing assembly 950 are angled inward to form a V-shape and assist with trench closure and seed casing deposition. Although a planting system with a seed opening and closing system is shown, by way of example, for depositing the combination of the seed and the seed growing environment within the soil and/or the combination of the seed, seed growing environment, and the housing (e.g., housing from canister, casing, or cartridge member 500, INPUTS 112A-112E and/or INPUTS 122A-122E) within the soil, the present disclosure contemplates other planting systems and methods. For example, the planting system can be configured based on the type(s) and amount(s) of INPUTS 112A-

Figure 6:
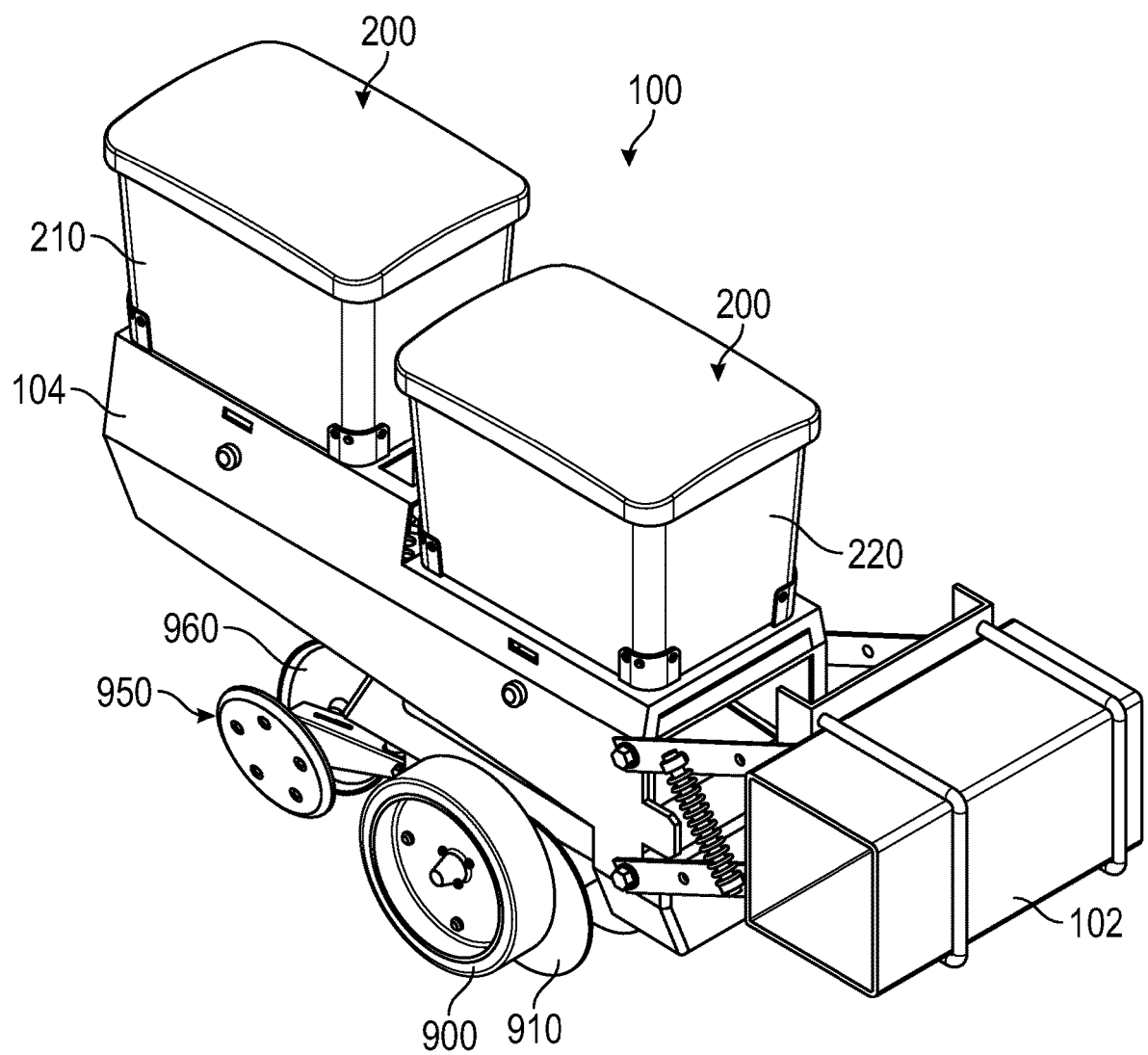
FIG. 6 illustrates a perspective view of a seed planter in accordance with an exemplary aspect of the present disclosure.
Figure 7:
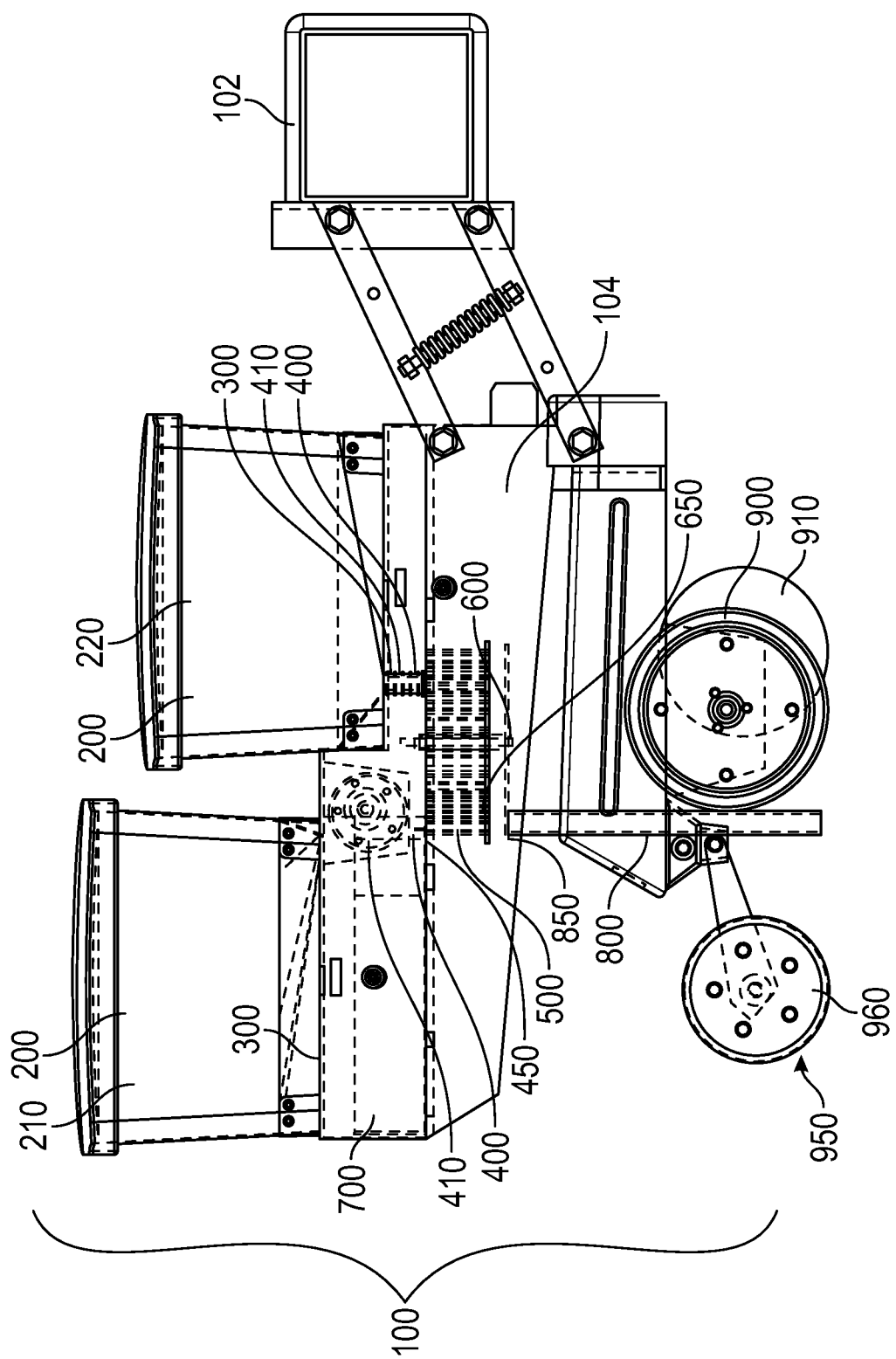
FIG. 7 illustrates a side view thereof.
Figure 8:
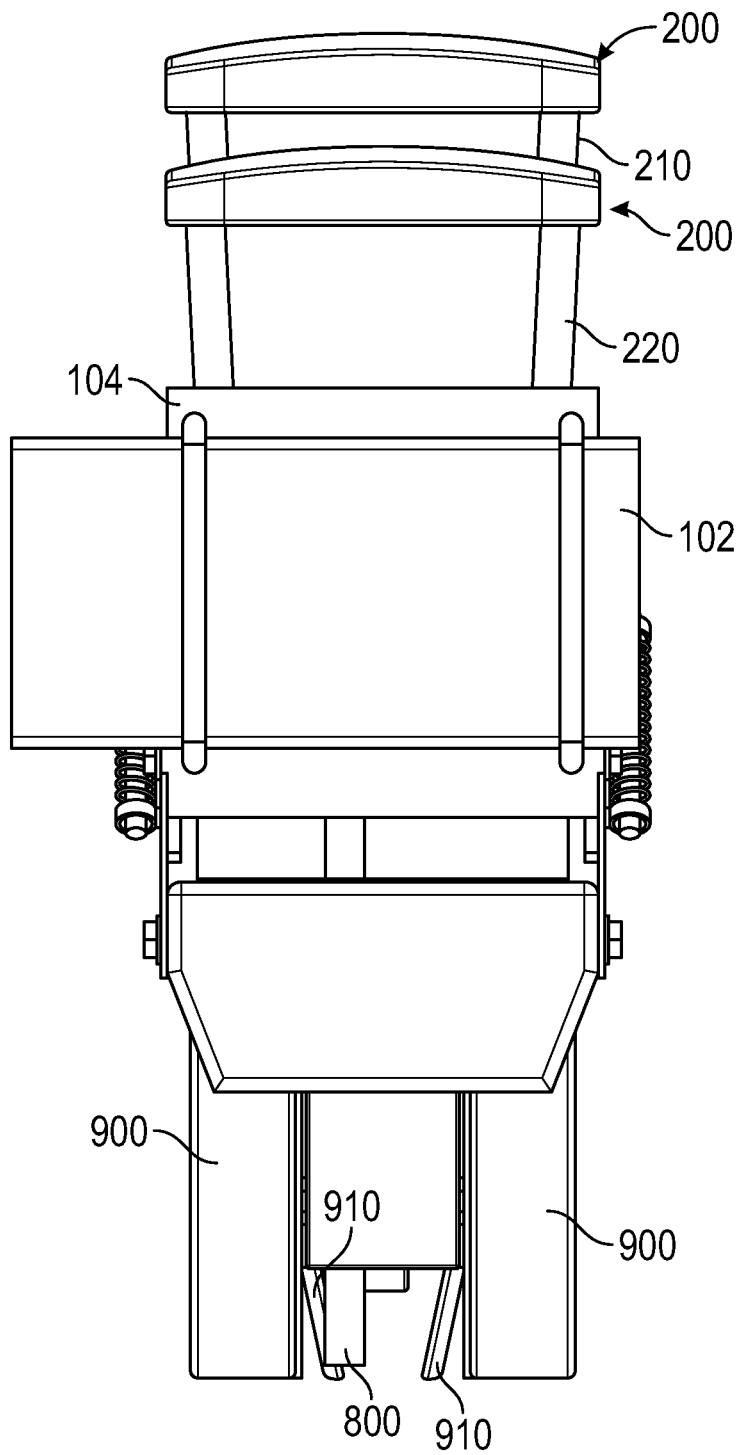
FIG. 8 illustrates a front view thereof.
Figure 9:
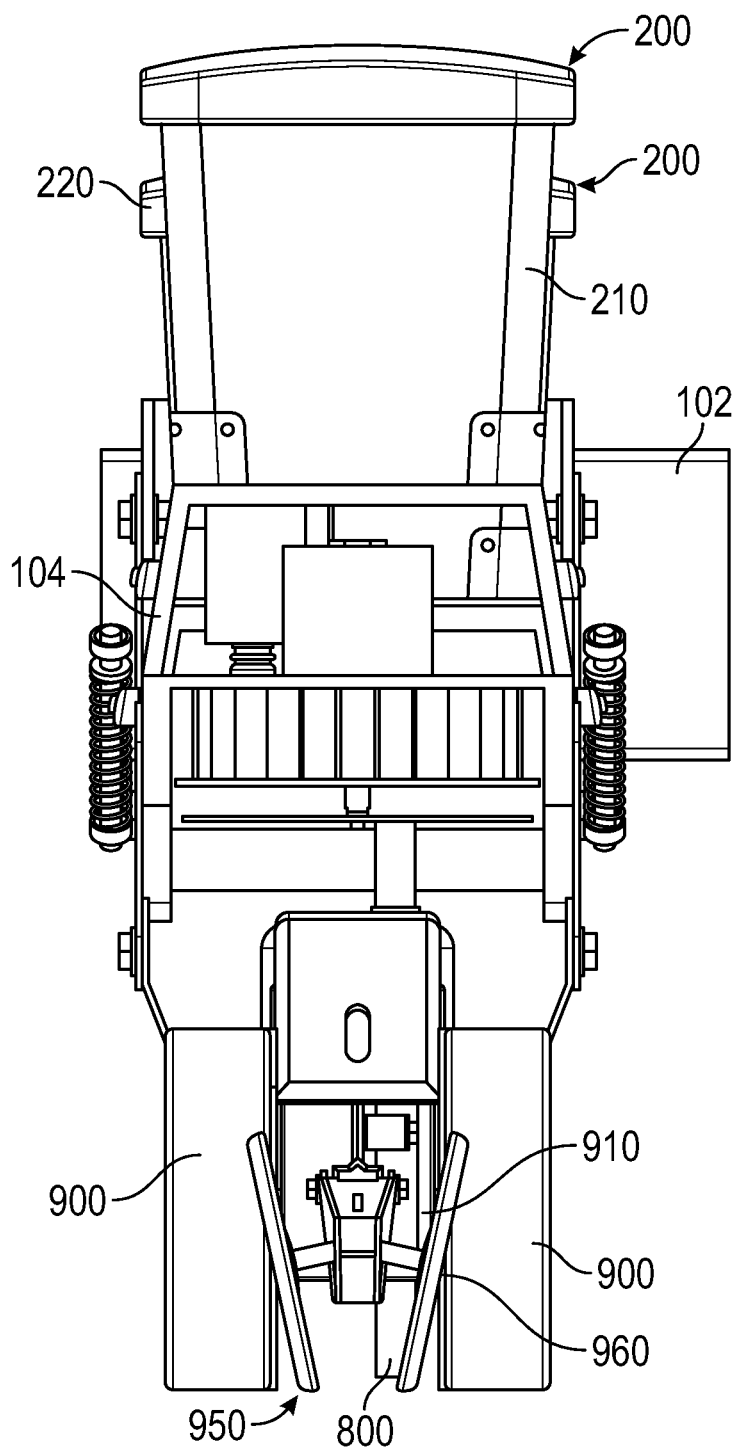
FIG. 9 illustrates a rear view thereof.
Figure 10:
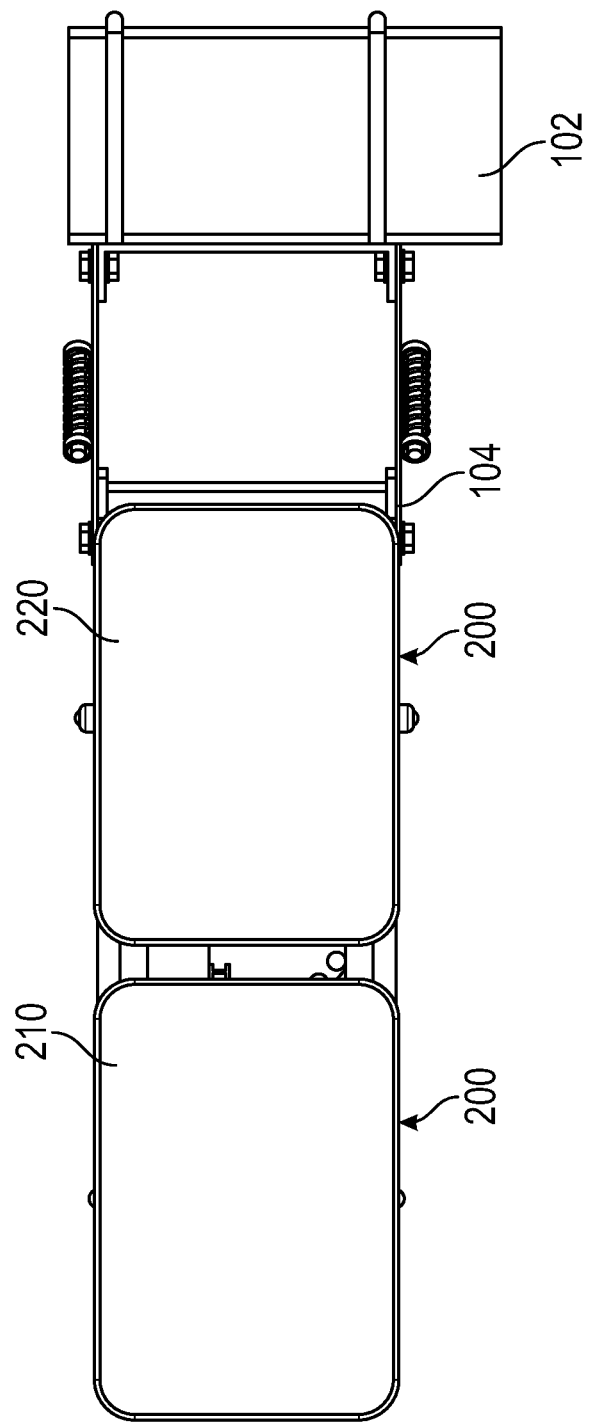
FIG. 10 illustrates a top view thereof.
Figure 11:
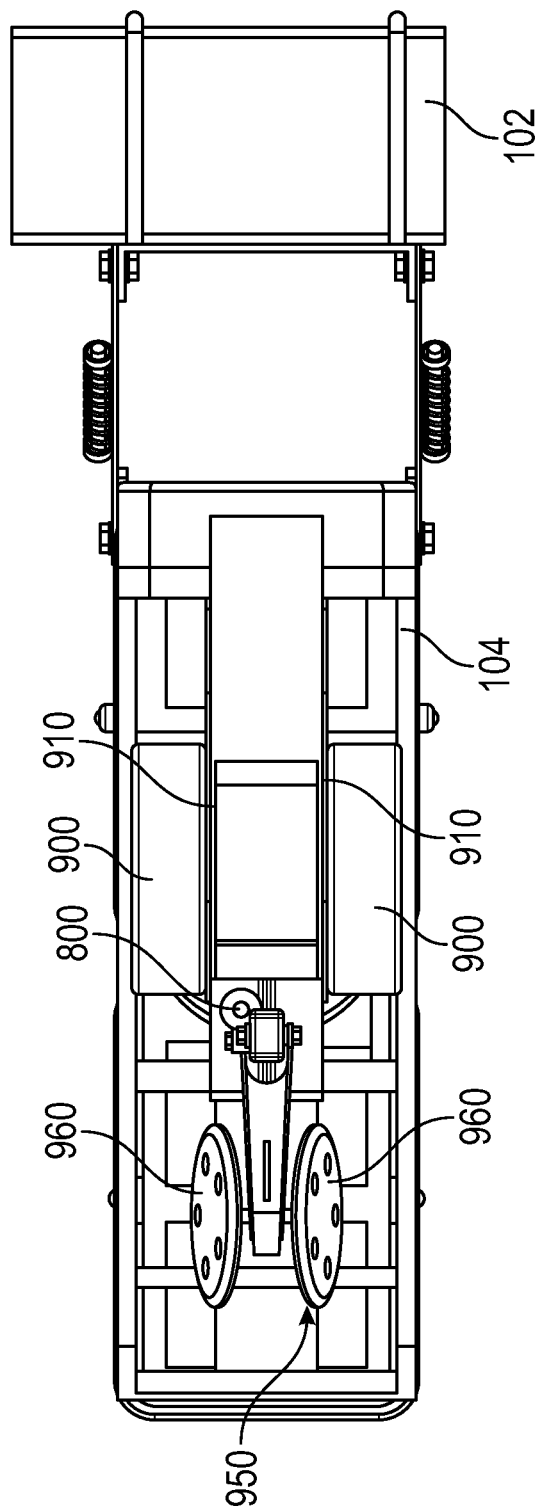
FIG. 11 illustrates a bottom view thereof.

112E and/or INPUTS 122A-122E. In one aspect, the planting system can include one or more rotary members with a plurality of outwardly extending planting tubes (e.g., spiked plunging wheel in place of an opening coulter), similar to seed tube or chute 800, that create an opening within the soil and fill the opening with the combination of the seed and the seed planting environment or the combination of the seed, the seed planting environment, and the housing using one or more pneumatically, hydraulically, electrically, and/or mechanically driven actuators, such as, for example, by using one or more actuator(s) 160 (e.g., planting mechanism(s) 166) based on one or more batches of actionable information, such as field and/or planting data and desired seed growing environment housing information (e.g., made operable via planting file(s) 178, GPS 176, sensors 174, controller(s) 170, and/or actuator(s) 160 shown in FIG. 2). In at least one aspect, forced air pressure or vacuum from a pneumatic system configured with one or more pneumatic solenoids may be used to deliver the combination of the seed and the seed planting environment or the combination of the seed, the seed planting environment, and the housing into the soil. In another aspect, one or more driven belts, augers, conveyors or the like may be operated to position, stage, and deliver the combination of the seed and the seed planting environment or the combination of the seed, the seed planting environment, and the housing into the soil or to one or more other operations of the seed planting system 100, which can be accomplished by being configured to operate independently or in combination with any one or more of the disclosed systems, subsystems, mechanisms, assemblies, and/or apparatuses. FIG. 8 illustrates the front view of the inventive seed planting system concept. FIG. 9 illustrates the rear view of the inventive concept to include at least one trench closing assembly 950 including a set of wheels or blades 960 disposed behind the at least one seed chute wherein the at least one wheels or blades 960 of trench closing assembly 950 are angled inward to form a V-shape. FIG. 10 illustrates the top view of the inventive seed planting system concept. FIG. 11 illustrates the bottom view of the inventive seed planting system concept. FIG. 6 illustrates the perspective view of the inventive seed planting system concept. Various related aspects of the inventive concept are also described in Appendix, which is incorporated herein by reference in its entirety. The following patents are incorporated by reference in their entireties: U.S. Pat. Nos. 4,092,936, 4,694,760, 5,165,351, and 20170049044A1.

Figure 12:
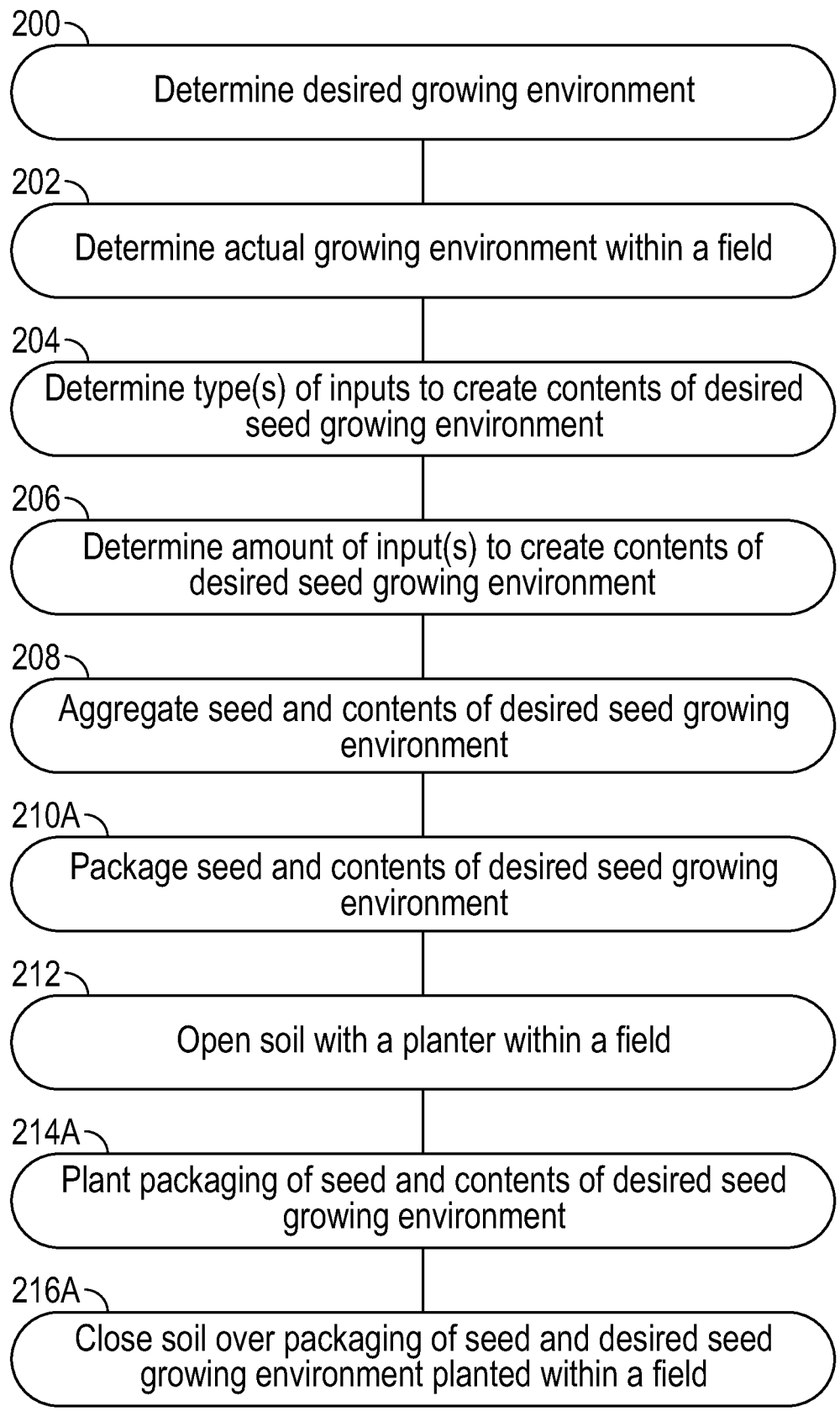
FIG. 12 is a pictorial representation of a flowchart illustrating a seed planting method in accordance with an exemplary aspect of the present disclosure.

Referring to FIG. 12 a pictorial representation of a flowchart illustrating a seed planting method in accordance with an exemplary aspect of the present disclosure is shown. The seed planting method includes all aspects relating to the systems and apparatuses of the present disclosure as discussed herein and present, by way of example, in FIGS. 1-11. In accordance with at least one aspect, a seed planting method of the disclosure includes, but is not limited to, such steps as determining, calculating, deriving, and/or entering information regarding a desired seed growing environment 200 based on one or more conditions for growing seed. This can include the step of determining, calculating, deriving, and/or entering information regarding the actual growing environment for one or more conditions within a field 202. The desired type(s) 204 and amount(s) 206 of INPUTS 112A-112D and/or INPUTS 122A-122D is determined for creating a desired seed growing environment. The inputs into the aggregator 130 are aggregated, such as where seed and contents of a desired seed growing environment are aggregated 208. Using one or more INPUTS 112A-112E and/or one or more INPUTS 122A-122E a housing, packaging, casing, or the like is created/provided for the seed and contents of the desired seed growing environment 210A, which is then, through operated conveyance and/or gravity, is communicated to the soil for planting. The seed planter opens the soil in the field 212 and the seed, contents of the seed growing environment, and housing for the contents of the seed growing environment are planted 214A, and the soil is closed over the seed, contents of the seed growing environment, and housing for the seed growing contents are closed in the soil within the field 216A.

Figure 13:
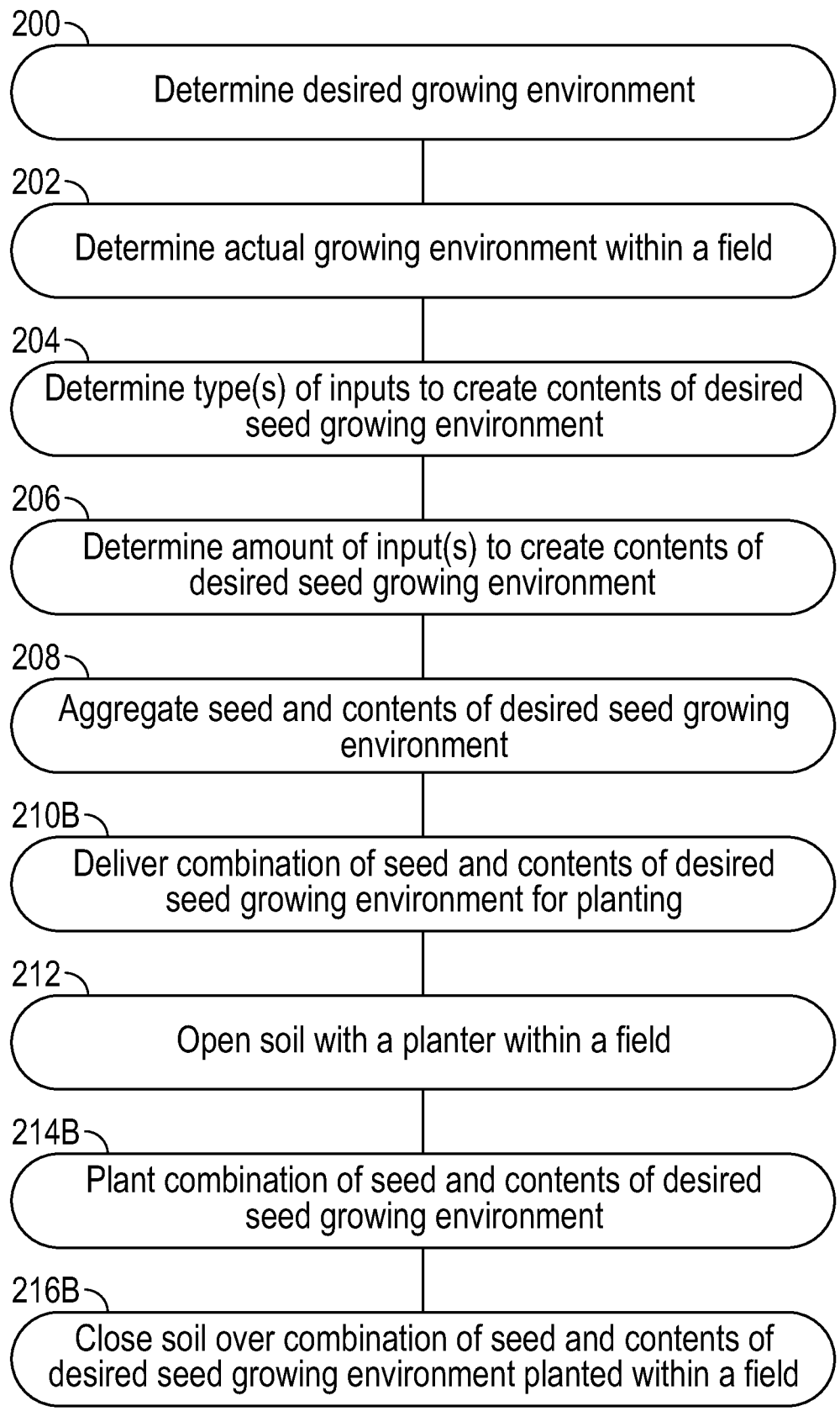
FIG. 13 illustrates a pictorial representation of a flowchart illustrating another seed planting method in accordance with an exemplary aspect of the present disclosure.

Referring to FIG. 13 a pictorial representation of a flowchart illustrating another seed planting method in accordance with an exemplary aspect of the present disclosure is shown. The seed planting method includes all aspects relating to the systems and apparatuses of the present disclosure as discussed herein and present, by way of example, in FIGS. 1-11. In accordance with at least one aspect, a seed planting method of the disclosure includes, but is not limited to, such steps as determining, calculating, deriving, and/or entering information regarding a desired seed growing environment 200 based on one or more conditions for growing seed. This can include the step of determining, calculating, deriving, and/or entering information regarding the actual growing environment for one or more conditions within a field 202. The desired type(s) 204 and amount(s) 206 of INPUTS 112A-112D and/or INPUTS 122A-122D is determined for creating a desired seed growing environment. The inputs into the aggregator 130 are aggregated, such as where seed and contents of a desired seed growing environment are aggregated 208. The combination of seed and contents of the desired seed growing environment is delivered for planting 210B, which is then, through operated conveyance and/or gravity, communicated to the soil for planting. The seed planter opens the soil in the field 212 and the combination of seed and contents of the seed growing environment are planted 214B, and the soil is closed over the combination of the seed and contents of the seed growing environment are closed in the soil within the field 216B.

While the inventive concept has been described above in terms of specific aspects, it is to be understood that the inventive concept is not limited to these disclosed aspects. Upon reading the teachings of this disclosure many modifications and other aspects of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

What is claimed is:

1. A seed planter for creating and planting together both seed and contents of a seed growing environment, the seed planter comprising:

a wheeled frame driven by a motor, the wheeled frame configured with at least one soil opener and at least one soil closer for planting a field;

a soil container assembly operably disposed on the wheeled frame, the soil container assembly configured for housing and metering soil;

a seed hopper disposed on the wheeled frame configured for housing and metering seed;

a seed growing environment aggregator assembly operably disposed on the wheeled frame, the aggregator assembly having at least one input opening for receiving a plantable portion of soil from the soil container and seed from the seed hopper and at least one discharge opening for discharging an aggregation of the plantable portion of soil and seed to the at least one soil opener for planting in the field;

wherein the seed growing environment aggregator assembly includes a seed casing assembly housing a plurality of seed casings for housing the aggregation of the plantable portion of soil and seed for planting in the field.

2. The seed planter of claim 1, a fertilizer container assembly operably disposed on the wheeled frame, the fertilizer container assembly configured for housing and metering fertilizer.

3. The seed planter of claim 2, wherein the seed growing environment aggregator assembly includes the at least one input opening for receiving the plantable portion of soil from the soil container, fertilizer from the fertilizer container assembly, and seed from the seed hopper and the at least one discharge opening for discharging an aggregation of the plantable portion of soil, fertilizer, and seed to the at least one soil opener for planting in the field.

4. The seed planter of claim 1, further comprising:
at least one controller for processing one or more field condition inputs, the at least one controller operably connected to one or more metering mechanisms for controlling the plantable portion of soil from the soil container assembly, seed from the seed hopper, and the aggregation from the seed growing environment aggregator assembly for preparing the aggregation of the plantable portion of soil and seed based on the one or more field condition inputs.

5. The seed planter of claim 1, wherein the seed growing environment aggregator assembly includes an aggregator mechanism.

6. A seed planting system for creating and planting together both seed and contents of a seed growing environment, the seed planter comprising:
a wheeled frame driven by a motor, the wheeled frame configured with at least one soil opener and at least one soil closer for planting a field;
one or more agricultural content sources disposed on the wheeled frame, the one or more agricultural content sources housing one or more types of agricultural seed growing content for preparing a seed environment, wherein at least one of the one or more types of agricultural seed growing content comprises seed growth medium;
a seed hopper disposed on the wheeled frame configured for housing and metering seed;
a seed growing environment aggregator assembly operably disposed on the wheeled frame, the aggregator assembly having at least one input opening for receiving a plantable portion of the one or more types of agricultural seed growing content from one or more agricultural content sources and seed from the seed hopper and at least one discharge opening for discharging an aggregation of the plantable portion of the one or more types of agricultural seed growing content and seed to the at least one soil opener for planting in the field;
wherein the seed growing environment aggregator assembly includes a seed casing assembly housing one or more seed casing inputs for preparing a seed casing from the one or more seed casing inputs for housing the aggregation of the plantable portion of the one or more types of agricultural seed growing content and seed for planting in the field.

7. The seed planting system of claim 6, wherein the one or more agricultural content sources comprise a seed growth medium container assembly operably disposed on the wheeled frame, the seed growth medium container assembly configured for housing and metering the seed growth medium to the seed growing environment aggregator assembly.

8. The seed planting system of claim 6, wherein the one or more agricultural content sources comprise a fertilizer container assembly operably disposed on the wheeled frame, the fertilizer container assembly configured for housing and metering fertilizer to the seed growing environment aggregator assembly.

9. The seed planting system of claim 6, wherein the one or more agricultural content sources comprise a chemicals container assembly operably disposed on the wheeled frame, the chemicals container assembly configured for housing and metering an insecticide, a fungicide, and/or a herbicide to the seed growing environment aggregator assembly.

10. The seed planting system of claim 6, wherein the one or more agricultural content sources comprise a biologicals container assembly operably disposed on the wheeled frame, the biologicals container assembly configured for housing and metering one or more biologicals to the seed growing environment aggregator assembly.

11. A method for planting seed by creating and planting together both seed and contents of a seed growing environment, the method comprising:
providing a wheeled frame driven by a motor, the wheeled frame configured with one or more soil openers, soil closers, types of agricultural seed growing content, seed, and seed growing environment aggregator assemblies operably disposed on the wheeled frame for planting seed together with contents of a seed growing environment within a field;
receiving a plantable portion of the one or more types of agricultural seed growing content and seed at the seed environment aggregator;
preparing an aggregation of the plantable portion of the one or more types of agricultural seed growing content and seed, wherein at least one of the one or more types of agricultural seed growing content comprises plant growth media for supporting plant growth;
encasing the aggregation of the plantable portion of the one or more types of agricultural seed growing content and seed within a seed casing; and
discharging an aggregation of the plantable portion of the one or more types of agricultural seed growing content and seed to the one or more soil openers for planting in the field.

12. The method of claim 11, further comprising:
at least one controller for processing one or more field condition inputs, the at least one controller operably connected to one or more metering mechanisms for controlling the plantable portion of the one or more types of agricultural seed growing content from the one or more types of agricultural seed growing content, seed from a seed hopper, and the aggregation of the plantable portion of the one or more types of agricultural seed growing content and seed from the one or more seed growing environment aggregator assemblies for preparing the aggregation of the plantable portion of the one or more types of agricultural seed growing content and seed based on the one or more field condition inputs.

13. The method of claim 11, wherein the one or more types of agricultural seed growing content further comprise one or more fertilizers, insecticides, fungicides, herbicides, and/or biologicals.

14. A seed planter for creating and planting together both seed and contents of a seed growing environment, the seed planter comprising:
- a wheeled frame driven by a motor, the wheeled frame configured with at least one soil opener and at least one soil closer for planting a field;
- a soil container assembly operably disposed on the wheeled frame, the soil container assembly configured for housing and metering soil;
- a seed hopper disposed on the wheeled frame configured for housing and metering seed;
- a seed growing environment aggregator assembly operably disposed on the wheeled frame, the aggregator assembly having at least one input opening for receiving a plantable portion of soil from the soil container and seed from the seed hopper and at least one discharge opening for discharging an aggregation of the plantable portion of soil and seed to the at least one soil opener for planting in the field;
- wherein the seed growing environment aggregator includes a seed casing assembly housing one or more seed casing inputs for preparing a seed casing from the one or more seed casing inputs for housing the aggregation of the plantable portion of soil and seed for planting in the field.

15. A seed planter for creating and planting together both seed and contents of a seed growing environment, the seed planter comprising:
- a wheeled frame driven by a motor, the wheeled frame configured with at least one soil opener and at least one soil closer for planting a field;
- a soil container assembly operably disposed on the wheeled frame, the soil container assembly configured for housing and metering soil;
- a seed hopper disposed on the wheeled frame configured for housing and metering seed;
- a seed growing environment aggregator assembly operably disposed on the wheeled frame, the aggregator assembly having at least one input opening for receiving a plantable portion of soil from the soil container and seed from the seed hopper and at least one discharge opening for discharging an aggregation of the plantable portion of soil and seed to the at least one soil opener for planting in the field;
- wherein the soil container assembly includes one or more soil harvesters for harvesting soil from the field for providing the plantable portion of soil.

16. A seed planting system for creating and planting together both seed and contents of a seed growing environment, the seed planter comprising:
- a wheeled frame driven by a motor, the wheeled frame configured with at least one soil opener and at least one soil closer for planting a field;
- one or more agricultural content sources disposed on the wheeled frame, the one or more agricultural content sources housing one or more types of agricultural seed growing content for preparing a seed environment, wherein at least one of the one or more types of agricultural seed growing content comprises seed growth medium;
- a seed hopper disposed on the wheeled frame configured for housing and metering seed;
- a seed growing environment aggregator assembly operably disposed on the wheeled frame, the aggregator assembly having at least one input opening for receiving a plantable portion of the one or more types of agricultural seed growing content from one or more agricultural content sources and seed from the seed hopper and at least one discharge opening for discharging an aggregation of the plantable portion of the one or more types of agricultural seed growing content and seed to the at least one soil opener for planting in the field;
- wherein the seed growing environment aggregator assembly includes a seed casing assembly housing a plurality of seed casings for housing the aggregation of the plantable portion of the one or more types of agricultural seed growing content and seed for planting in the field.

17. A method for planting seed by creating and planting together both seed and contents of a seed growing environment, the method comprising:
- providing a wheeled frame driven by a motor, the wheeled frame configured with one or more soil openers, soil closers, types of agricultural seed growing content, seed, and seed growing environment aggregator assemblies operably disposed on the wheeled frame for planting seed together with contents of a seed growing environment within a field;
- receiving a plantable portion of the one or more types of agricultural seed growing content and seed at the seed environment aggregator;
- preparing an aggregation of the plantable portion of the one or more types of agricultural seed growing content and seed, wherein at least one of the one or more types of agricultural seed growing content comprises plant growth media for supporting plant growth;
- encasing the aggregation of the plantable portion of the one or more types of agricultural seed growing content and seed within a seed casing composed of one or more seed casing inputs; and
- discharging an aggregation of the plantable portion of the one or more types of agricultural seed growing content and seed to the one or more soil openers for planting in the field.

* * * * *